United States Patent [19]

Bonzo

[11] Patent Number: 4,573,896

[45] Date of Patent: Mar. 4, 1986

[54] APPARATUS FOR SELECTIVELY MANIFOLDING HONEYCOMB STRUCTURES

[75] Inventor: Roy T. Bonzo, Painted Post, N.Y.

[73] Assignee: Corning Glass Works, Corning, N.Y.

[21] Appl. No.: 487,446

[22] Filed: Apr. 21, 1983

Related U.S. Application Data

[62] Division of Ser. No. 283,732, Jul. 15, 1981.

[51] Int. Cl.$^4$ ............................................. B29C 27/14
[52] U.S. Cl. ................................. 425/125; 264/271.1; 264/273; 264/275; 425/127; 425/128; 425/129 R
[58] Field of Search .......................... 156/500, 89, 245; 425/125, 126 R, 127, 128, 129 R, 542; 92/100; 141/258; 264/271.1, 273–275

[56] References Cited

U.S. PATENT DOCUMENTS

| | | | |
|---|---|---|---|
| 2,030,132 | 2/1936 | Apple | 425/128 |
| 2,949,643 | 8/1960 | Hosbein | 264/275 |
| 2,986,411 | 5/1961 | Anderson | 264/275 X |
| 3,175,472 | 3/1965 | Little | 92/100 X |
| 3,204,858 | 9/1965 | Dros | 92/100 X |
| 3,489,829 | 1/1970 | Lipfert | 264/273 |
| 3,938,923 | 2/1976 | Dziedzic | 425/127 |
| 4,032,611 | 6/1977 | Fukuoka | 264/273 X |
| 4,252,513 | 2/1981 | Kalnins | 425/127 X |

*Primary Examiner*—David Simmons
*Attorney, Agent, or Firm*—R. N. Wardell

[57] ABSTRACT

The invention comprises a method and various apparatus related to fabricating solid particulate filter bodies and other honeycomb structures the cells of which are selectively charged with a plugging or other flowable material. Solid coverings are applied over the end faces of a honeycomb structure, preferably an adhesive backed transparent thermoplastic film such as polyester, openings are created through the covering, preferably by melting the thermoplastic film, and the sealing or other flowable material is charged through the openings formed in the covering into the underlying cells.

A porous walled honeycomb structure having coverings adhered to its end faces with selective openings therethrough is itself a solid particulate filter of some usage. A more substantial solid particulate filter body may be formed by charging a more durable sealant through the openings to form plugs and removing the coverings.

An envisioned automated method and apparatus for forming openings through the covering is described and consists of an image analyzer which examines the surface of the structure and outputs signals to a jig for precision positions of a tool for forming openings through the covering.

Other ancillary apparatus and methods described include: a double headed press for simultaneously charging ceramic cement or other flowable materials into both end faces of a honeycomb structure; opening forming tools mounting a plurality of opening forming elements; and a dispenser for automatically applying a preformed flexible covering such as a polyester film to an end face of a honeycomb structure.

4 Claims, 20 Drawing Figures

APPARATUS FOR SELECTIVELY MANIFOLDING HONEYCOMB STRUCTURES

This is a division, of application Ser. No. 283,732, filed July 15, 1981.

BACKGROUND OF THE INVENTION

This invention relates to charging flowable materials into selected cells of a honeycomb structure and, more particularly, to a method and related apparatus for selectively manifolding (i.e. plugging) cells of a honeycomb structure for the fabrication of filter bodies and other manifolded honeycomb structures.

Honeycomb structures having transverse cross-sectional cellular densities of one to several hundred cells per square inch, especially when formed from ceramic materials, have several uses, including solid particulate filter bodies and stationary heat exchangers, which require selected cells of the structure to be sealed by manifolding or other means at one or both of their ends. The term "seal" and its corresponding grammatical and derivative forms (i.e. "sealed", "sealant", "sealing", etc.) are used herein to refer to both porous and nonporous closing and means of closing the open transverse cross-sectional areas of the cells of honeycomb structures.

It is well known that a solid particulate filter body may be fabricated utilizing a honeycomb structure formed by a matrix of intersecting, thin, porous walls which extend across and between two of its opposing end faces and form a large number of adjoining hollow passages, channels or cells which also extend between and are open at the end faces of the structure. To form a filter, one end of each of the cells is sealed, a first subset of cells being sealed at one end face and the remaining cells being sealed at the remaining opposing end face of the structure. The contamination fluid is brought under pressure to one face ("inlet" face) and enters the filter bodies via the cells which are open at the inlet face ("inlet" cells). Because the inlet cells are sealed at the remaining ("outlet") end face of the body, the contaminated fluid is forced through the thin, porous walls into adjoining cells which are sealed at the inlet face and open at the outlet end face of the filter body ("outlet" cells). The solid particulate contaminant in the fluid which is too large to pass through the porous openings in the walls is left behind and a now cleansed fluid exits the filter body through the outlet cells for use.

Rodney Frost and Irwin Lachman describe and claim in a copending application Ser. No. 165,646, filed July 3, 1980 and entitled FILTER AND RELATED APPARATUS, a most efficient solid particulate filter body formed from a honeycomb structure in which the cells are provided in transverse, cross-sectional densities between approximately one and one hundred cells per square centimeter with transverse, cross-sectional geometries having no internal angles less than thirty degrees, such as squares, rectangles, equilateral and certain other triangles, circles, certain elipses, etc. The cells are also arranged in mutually parallel rows and/or columns. Alternate cells at one end face are filled in a checkered or checkerboard pattern and the remaining alternate cells are sealed at the remaining end face of the structure in a reversed pattern. Thus formed, either end face of the filter body may be used as its inlet or outlet face and each inlet cell shares common walls with only adjoining outlet cells, and vice versa. Other cellular cross-sectional geometries and other patterns of sealed cells may be employed to fabricate effective, although perhaps less efficient filter bodies than those of Frost and Lachman.

For the mass production of such filters, it is highly desirable to be able to seal selected cell ends as rapidly and as inexpensively as possible. Frost and Lachman in the previously referred to application Ser. No. 165,646 describe fabricating filter bodies by plugging the end of each cell individually with a hand-held, single nozzle, air actuated sealing gun. The hand plugging of individual cells by this process is long and tedious and is not suited for the commercial production of such filters and other manifolded honeycomb structures which may have thousands of cells to be selectively sealed. Frost and Lachman also postulate the use of an array of sealant nozzles so that the sealing mixture may be simultaneously injected into a plurality or all of the alternate cells at each end face of the honeycomb structure. However, a working model of this device is not known to exist for plugging honeycomb structures having the higher cell densities referred in.

An alternative approach to manifolding selected cells at an end face of a honeycomb structure is described and claimed by Rodney Frost and Robert Paisley in another pending application Ser. No. 283,733, filed on July 15, 1981 and entitled *METHOD AND APPARATUS FOR SELECTIVELY CHARGING HONEYCOMB STRUCTURES*, in which an open surface of a honeycomb structure is covered by a mask having a number of openings extending through it. Sealing material is charged against the outer surface of the mask and through its openings into the proximal open ends of cells opposite the openings. Frost and Paisley specifically describe the use of a rigid plate having a plurality of bores extending through it which are spaced and sized to coincide with the open ends of the selected cells at the end face of a honeycomb structure when the plate is positioned against the end face and aligned with its bores over selected cells. Successful use of such an apparatus is dependent upon the ability to provide honeycomb structures having end faces conforming to the face of the covering apparatus so as to prevent gaps therebetween which would allow the sealing material to charge into adjoining cells and to provide predetermined, undistorted positioning of the cells at the end face of the honeycomb structure for accurate registration of the selected cells with the openings in the mask, again, to prevent possible charging of sealing material into adjoining cells.

Masks have also been formed for manifolding cells which are regularly interspersed among essentially mutually parallel rows and essentially mutually parallel columns at an open surface of a honeycomb structure by applying strips of an adhesive backed flexible webbing impermeable to the sealing material, such as masking tape, over selected rows and columns of cells or, alternatively, by providing a matrix of spaced, overlayed strips of a resilient, impermeable and reusable material such as metal foil which are joined together and fitted with or without an underlying gasket, over the open surface of the structure with openings through the matrix and gasket, if provided, aligned over the cells to be charged. By providing a honeycomb structure with cells arranged in mutually parallel rows and mutually parallel columns and covering alternate rows and alternate columns of cells with strips of a suitable flexible material such as the masking tape or the joined thin metal strips, the open ends of one-half of a subset of cells arranged in a checkered pattern across the end face were exposed. After filling the ends of these cells, the strips were removed and strips applied covering the remaining alternate rows and remaining alternate columns thereby exposing the open ends of the remaining half of the subset of cells of the checkered pattern at the end face for filling. Both embodiments provide greater flexibility in dealing with surface height variations and better sealing of the cell ends including those which may be damaged than does the rigid plate embodiment. However, both embodiments must be applied twice to each end face to manifold the alternate cells in the desired checkered pattern of Frost and Lachman. This is a significant limitation with respect to the tape strips which must be individually applied across each end face, a time consuming task. The reusable matrix and gasket of the second embodiment may be more quickly applied and removed, but like the rigid plate embodiments, cannot be adapted to distortions in the cell locations at the end faces.

Noll, et al in U.S. Pat. No. 4,041,591, describe alternate methods of fabricating a multiple flow path body such as a stationary heat exchanger in which a honeycomb structure is provided having its cells arranged in columns across its open end faces, an open end face of a honeycomb structure is dipped into a flowable resist material and the resist material removed from selected columns by cutting it away together with the common walls of the adjoining cells in the selected column or, alternatively, the walls between the adjoining cells of the selected columns are cut away at the open end face of the structure before dipping the end face into the flowable resist material, then the resist material is blown from the selected columns using compressed air directed down the selected columns where the adjoining cell walls have been removed. The end face was thereafter dipped into a slurry of cement to form a sealed channel across each of the selected columns. The remaining flowable resist material was subsequently removed by heating. As the cross-sectional density of cells in the honeycomb structure is increased, for example to improve the efficiency of a filter body, the tolerances needed for the removal of adjoining cell walls required by the Noll, et al method tighten. The problem is particularly heightened when the filter bodies are fabricated from extruded ceramic or ceramic based honeycomb structures as the present state of the ceramic extrusion art cannot provide perfectly parallel rows and/or columns of cells. Also, the Noll, et al method requires the partial destruction of adjoining cell walls and is entirely unsuited for the fabrication of filter bodies where the cells are sealed in a checkered and other possible alternating cell patterns at the end faces.

SUMMARY OF THE INVENTION

It is an object of the invention to provide a method for selectively bulk charging cells of a honeycomb structure which is compatible with any desired pattern of cells selected to be charged.

It is yet another object of the invention to minimize the overspill of sealing material when bulk charging selected cells of a honeycomb structure.

It is yet another object of the invention to provide a more rapid and inexpensive method of manifolding honeycomb structures into solid particulate filter bodies.

It is yet another object of the invention to provide a method for manifolding solid particulate filter bodies from ceramic honeycomb structures which minimize the generation of pinholes in the ceramic sealing material used.

It is yet another object of the invention to provide an improved method for achieving uniform sealing material depth when bulk manifolding selected cells of a honeycomb structure.

These and other objects are accomplished by one aspect of the invention in which a solid covering is provided over an open surface and the open ends of cells or channels of a honeycomb structure; openings are formed through the covering at selected locations by suitable methods such as piercing, cutting, boring or, melting; and a flowable material is charged by a suitable means through the openings in the covering and into the proximal ends of the opposing cells.

In a preferred embodiment, a solid particulate filter body is fabricated from a porous, preferably ceramic-based honeycomb structure using this method, by covering both end faces of the structure with a flexible film, preferably a high molecular weight polymer and preferably, a polyester and forming openings through the covering, preferably in the case of the polymer film by melting, opposite a subset of cells at one end face and through the covering at the remaining end face opposite all or substantially all of the remaining cells. An appropriate plugging material is then charged through the openings. The method may be practiced on either fired (i.e. dried and sintered) or green (dried but not sintered) ceramic-based honeycomb structures using appropriate sealants.

When the cells to be charged are uniformly spaced from one another across the end face or in smaller patterns repeated across the end face, as when fabricating a solid particulate filter body having a checkered or checkerboard pattern of sealed cells, the opening forming step can be made more efficient by providing a tool having a plurality of appropriately spaced opening forming elements so as to form several openings each time the tool is applied to the covering. In one embodiment, a heating tool having a plurality of heated elements is provided to melt a plurality of openings through the polymer film each time it is applied.

Yet another aspect of the invention is the solid particulate filter body which is fabricated by forming a solid covering over each of the end faces of a porous walled honeycomb structure and forming openings through the covering at one end face opposite a subset of cells and through the covering at the remaining end face opposite all or substantially all of the structure's remaining cells. In one embodiment a preformed film, preferably a polymer which can be adhesive-backed and pressure-sensitive tape, is adhered to the end faces and openings formed by melting.

In yet another aspect, the invention is a method and apparatus for automatically forming openings through a covering over an open surface of a honeycomb structure. The cells are located beneath the covering by a suitable device. Preferably the covering is a transparent film, preferably a polyester, and the end face of the honeycomb structure is scanned through the covering by a suitable optical device, such as a television camera, which generates and outputs signals indicating the locations of cells and/or thin walls. In response to these signals a computer outputs a second set of signals to control the positioning of an opening forming device, preferably a heated tool for melting the preferred polyester film, which is itself carried on a precision positioning jig operating in response to the signals outputted by the computer.

In yet another aspect, the invention is an apparatus for pressing a plastically formable material into the cells of a honeycombed structure, including one having its end faces covered by a perforated film or other secured mask. The apparatus consists of a press head having a chamber, which is open at one of the press head outer surfaces, over which is secured an open end face of a honeycomb structure. A charge of the plastically formable material is loaded into the chamber with the structure in place. Piston means are provided mounted in a bore extending through the press head towards the chamber to press the material into the cell ends. The press head may also be provided with a flexible, pneumatically operated collar for securing the honeycomb structure in place during the pressing operation and a pair of press heads may be provided so that both ends of the honeycomb structure may be filled in a single operation.

In yet another aspect, the invention is a method and apparatus for applying a preformed flexible material, such as a polymer film, to an end face of a honeycomb structure. Means are provided for positioning a length of the film opposite the end face. Other means provided for pressing the film against the end face surface are then activated. Finally, additional means provided for pressing the excess film against the side walls of the honeycomb structure are activated to complete the application. Where the film is stored on a roll, means are also provided for holding the leading edge of the film away from the roll so that it may be moved opposite the end face by the means for positioning. Means are also provided for severing the length of film which has been positioned over the end face from the remainder of the film on the roll.

In yet another aspect of the invention is a total having a plurality of opening forming elements which are mounted to accommodate some cellular distortions and heated for melting openings through appropriate coverings over a honeycomb surface.

DETAILED DESCRIPTION OF THE DRAWINGS

The various aspects of the invention are better understood with reference to the accompanying drawings, in which.

DETAILED DESCRIPTION OF THE INVENTION

Figure 1:
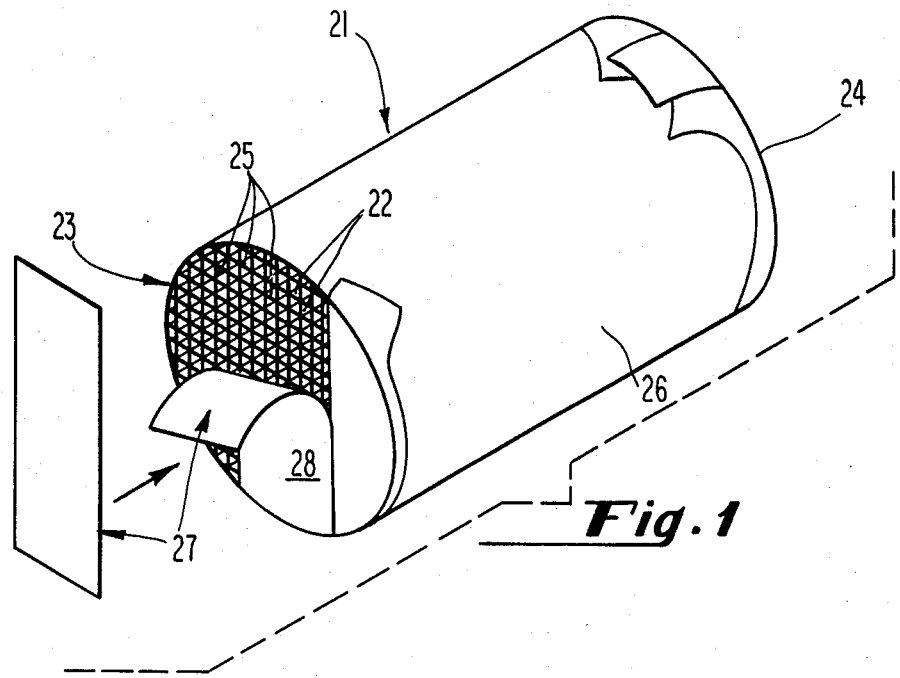
FIG. 1 depicts schematically the step of covering the open surface of the honeycomb structure according to the invention.

In one aspect, the invention is a method for bulk charging a flowable material into selected cells of a honeycomb structure, that is to say a structure formed substantially or entirely by adjoining hollow, open-ended passages, channels or cells or any other structure having a honeycomb surface formed by a large number of small, adjoining cells, by securing a covering to the cells at the open surface of the structure where they are exposed, forming openings at selected points through the covering opposite cells selected to be charged and charging the flowable material through the openings in the covering into the proximal open ends of the selected cells.

One significant use of the invention is in the fabrication of solid particulate filter bodies as are described by Frost and Lachman in the copending application Ser. No. 165,646 incorporated in its entirety by reference herein. The practice of the inventive method in the fabrication of such filter bodies is now described with reference to FIGS. 1 through 5.

First, a suitable honeycomb structure 21 is provided having a large number of mutually adjoining hollow passages, channels or cells 22. To reduce back pressure in the filter body being fabricated, the cells 22 typically extend in an essentially mutually parallel fashion through the structure 21. The ends of the cells 22 are open at and form a pair of substantially identical open outer surfaces at end faces 23 and 24 (hidden in FIGS. 1 and 2) of the structure 21. The cells 22 are themselves formed by a matrix of intersecting walls 25 which extend across and between each of the end faces 23 and 24. For filter body applications, the walls 25, are porous, continuous and preferably uniformly thin although walls of nonuniform thickness may be used with less efficiency. The honeycomb structure 21 may also be provided with an outer "skin" 26 around the cells 22 between the end faces 23 and 24.

Honeycomb structures for solid particulate filter bodies and other applications may be formed from a variety of materials including ceramics, glass-ceramics, glasses, metals, cermets, resins or organic polymers, papers or textile fabrics (with or without fillers, etc. and various combinations thereof) and by a variety of methods depending upon the material selected. Honeycomb structures having the necessary uniformly thin, porous and interconnected walls for solid particulate filtering applications are preferably fabricated from plastically formable and sinterable finely divided particles and/or short length fibers of substances that yield a porous, sintered material after being fired to affect their sintering, especially metalics, ceramics, glass-ceramics, cermets, and other ceramic based mixtures. An extruded cordierite ceramic honeycomb structure preferred for moderately high temperature solid particulate filtering applications may be provided in the manner described in the aforementioned Frost and Lachman application Ser. No. 165,646. Compositions of various open porosities are described. Typically the end faces 23 and 24 of the structure will be leveled and squared with or made substantially perpendicular to the center line and/or side walls 26 of the structure, if desired, and cleaned of dust and debris.

For illustrative purposes only, the cells 22 of the structure 21 are provided with square, transverse cross-sectional areas and are arranged at the end faces 23 and 24 (hidden) in substantially mutually parallel rows and substantially mutually parallel columns. It will be appreciated that other transverse cross-sectional cellular geometries and other arrangements of cells may be utilized generally in both the fabrication of solid particulate filter bodies and in the application of the inventive method.

After cleaning, a solid covering 28 impermeable to the sealing material to be charged into the cells is next secured over the open ends of the cells at an open surface of the honeycomb structure where they are exposed. In FIG. 1, a covering 28 is formed by strips 27 of a flexible pre-formed film applied in an overlapping fashion so as to eventually completely cover the end face 23. The end face 24 has been previously covered in a similar manner. Ordinary masking tape (i.e. an adhesive-coated paper tape) has been used in the practice of the invention, but high molecular weight thermoplastic film, especially transparent films such as polyester, are preferred for reasons to be described. The strips 27 carry a pressure sensitive adhesive backing and are pressed against and adhere to the thin walls 25 at the end faces 23 and 24 and sidewalls 26 of the structure 21. It is also envisioned that thin films may be adhered to the end faces of the structure 21 by thermosetting adhesives or through the use of heat shrink fit polymer films. Adhering the covering to the end face reduces the likelihood of the covering shifting on the end face during the charging step and of seepage of the filling material into the covered cells by a poor fit between the covering and the end face. Where an adhesive backed tape cannot be obtained in widths adequate to cover the entire open surface of the honeycomb structure, the strips should be slightly overlapped as indicated in FIG. 1. Approximately 1/16th of an inch (0.96 mm) was found adequate for the adhesive backed masking tape and polyester film.

Figure 2:
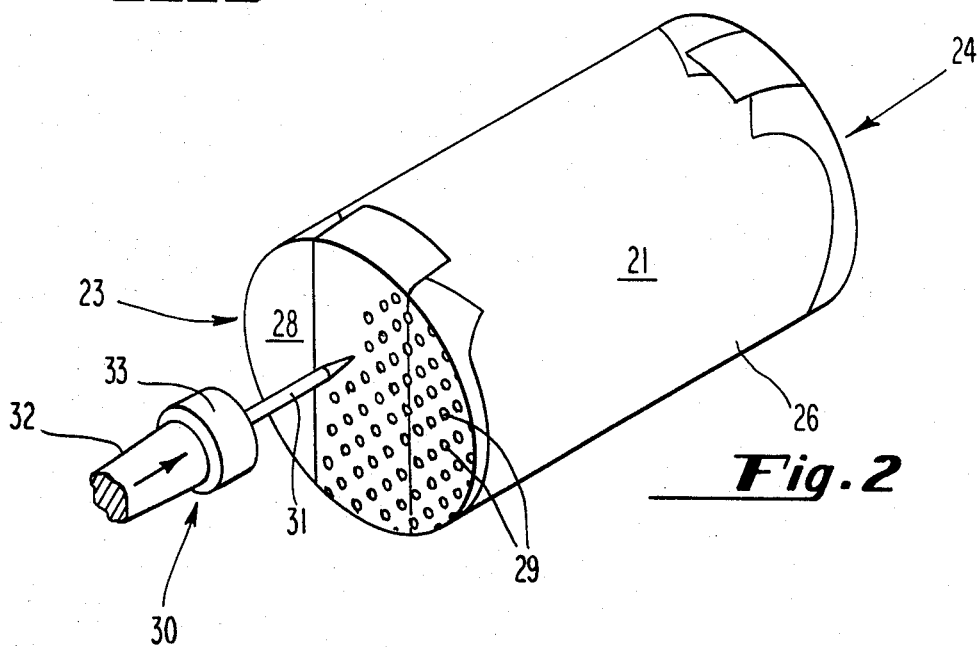
FIG. 2 depicts schematically the step of creating openings through the covering at the end face of the honeycomb structure according to the invention.

According to the invention, openings 29 are next made through the covering 28 by any means suitable for the covering selected opposite each of the cells to be charged. Openings 29 may be formed through the covering 28 formed by the strips 27 of masking or plastic tape over the end faces 23 and 24 by such methods as cutting, boring or drilling. Preferably however, a thermoplastic film is used as the covering 28 and a tool 30 having one or more opening forming elements 31 which are heated as used to create openings as is depicted in FIG. 2. It has been found that a probe element 31 heated to approximately 500° F. (260° C.) melts a one mil thick (0.001 inch or 0.025 mm) polyester film such as Scotch Brand Magic Transparent Tape TM almost upon contact and creates a large, clean edged opening through the film opposite the cell over which the element 31 was first placed. Tuck Industries, Inc., tape style No. 64 and Formel Adhesive Products, Inc. style No. 054 tape have also been found to be clean melting transparent polyester tapes which are particularly easy to use and suitable for this process.

It will be appreciated that the tool 30 may be used with other meltable, resilient, impermeable non-preformed coverings. For example, end faces 23 and 24 may be dipped in or coated with a hot melt glue or a wax as beeswax or paraffin and openings created through such covering with the tool 30. Similarly, it will be appreciated that openings can be created throught other coverings including the hot melt glue and wax by other means such as boring, drilling, cutting or the like. It is also envisioned that heat may be applied to a meltable covering by other types of sources such as a laser, intense light, or even a small flame so as to melt a suitable opening therethrough.

The covering 28 must be selected so that the ends of the cells 22 can be located and the openings formed in the covering opposite those to be charged. If the preferred transparent polymer tape is used, the cells are visible through the tape. The walls forming the cells may also be visible through the hot melt glue or wax if sufficiently thin over the end face of the structure. Cells may be located through some flexible coverings such as masking tape by pressing the tape hard against the end face causing it to depress slightly into the cells. This is the least desired approach.

A hand-held, heated tool 30 as is depicted in FIG. 2 can by constructed from a pen-type soldering iron 32 by attaching to a coupling, such as a copper cap 33 which is threaded or otherwise formed to mate with the heated end of the iron 32, a brass or coppen pin (the opening forming element 31) by silver soldering or other suitable processes.

Figure 2A:
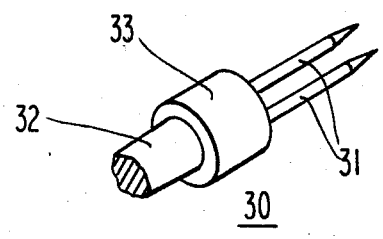
FIG. 2a depicts an embodiment of a multiple head tool for creating multiple openings through the covering depicted in FIG. 2.

When cells 22 to be manifolded are regularly spaced from one another either across the entire open surface of the structure, as in the structure 21 depicted, or repeatedly across small segments of the open surface, multiple opening forming elements 31 as indicated in FIG. 2a may be used to create a plurality of openings 29 through the covering 28 upon each application of the tool 30. The number of opening forming elements 31 which may be successfully employed on a single tool 30 will depend, in part, upon the degree to which distortions in the cellular arrangements can be minimized in the honeycomb structures provided. For example, it has been found that in the cordierite honeycomb structures provided by the extrusion method referred to in the aforesaid Frost and Lachman application Ser. No. 165,646 with cells having square cross-sections and arranged in mutually parallel rows and mutually parallel columns as is the structure 21 of FIGS. 1 and 2, at a cellular density of approximately 100 cells/sq. in. (15.5 cells/sq. cm) and wall thicknesses of 0.017 inches (0.043 mm), that sixteen opening forming elements 31 arranged in a four-by-four matrix could be used with regular success to form openings over only the alternate cells at the end faces of the honeycomb structure but that a five-by-five matrix could not. This was due primarily to distortions in the cellular arrangements arising during the fabrication of the structure but also to the difficulty of hand aligning the tool with such small cells.

The number of opening forming elements which may be successfully employed on a single tool will also depend, in part, upon the ability to create openings through the covering without disturbing it. In this regard, if sufficient heat is applied, very little force is needed to form openings through a polyester film by heated, opening forming elements.

It has been found that the tip shape of the heated opening forming elements used to melt the polyester tape can be varied in accomplishing the melting. Tips ranging from a flat surface covering substantially all of the open area of an end of a cell to a pointed needle much smaller in diameter than the smallest width of open cross-sectional areas of the cells have been successfully used. It is found, however, that opening forming elements 31 having tapered tips as indicated in FIGS. 2 and 2a simplified centering the tool. Working with structures having cells with square cross-sections in densities of approximately 100 cells/sq. in. (15.5 cells/sq. cm) and formed from walls approximately 0.017 inches (0.4 mm) thick, a single probe with a base structure slightly larger in diameter than the minimum inner diameter of the cells and tapered approximately one-half inch along their length at an approximate included angle of 60° to a blunt or pointed tip was found satisfactory. Blocks of multiple probes were found to be more easily fabricated by packing square copper elements together which were conically tapered to points at an included angle of about 45° at their tips. Tapering the tips also reduces the likelihood of the cell wall ends being hit and damaged by an opening forming element. It may also be desirable to move the tapered heated probe(s) gently in a slight rotating and/or laterally vibrating motion after piercing the tape so as to widen the opening to approximately the inner diameter of the cells. It has also been found desirable when forming openings through a polyester tape with a hand-held heated tool to firmly hold the structure 21 in position while locating the opening forming element 31 of the tool against the covering 28 but allowing free lateral movement of the structure when the tool begins piercing the covering so that it may self-center within the cell. Additionally, the opening forming elements 31 may be flexibly or floatably mounted so as to accomodate some distortions in the alignment of the cells 22 and walls 25. Particular tool embodiments having flexibly or floatably mounted opening forming elements will be disussed subsequently.

Figure 3:
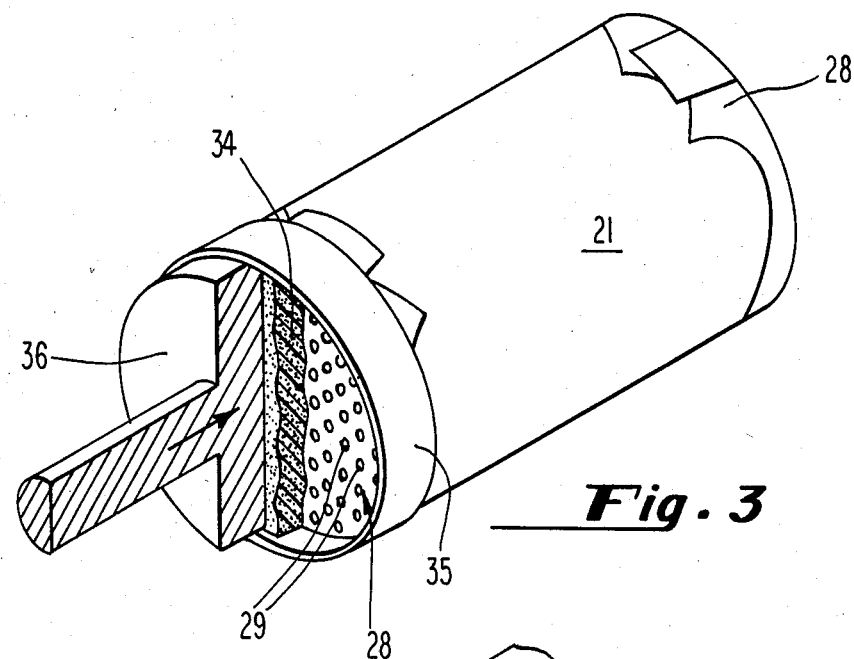
FIG. 3 depicts schematically the step of charging a sealing material into selected cells of the honeycomb structure by pressing.
Figure 4:
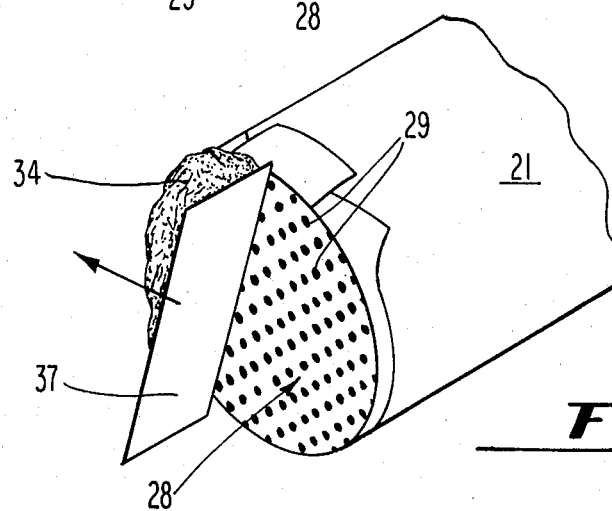
FIG. 4 depicts schematically squeegeeing a sealing material into the ends of selected cells of a honeycomb structure.

Next, according to the invention, a flowable material is charged into the cell ends opposite the openings formed through the covering. For fabricating a filter body, a suitable sealing material is charged by a means suitable for the sealing material, covering 28 and honeycomb structure 21 selected, into the cell ends opposite each opening 29. For example, a mass of plastically formable sealing material 34 may be applied to the outer surface of the covering 28 at the end face 23 and held over the end face by some suitable means, such as a collar 35 and the sealing material 34 pressed through the openings 29 into the proximal ends of the cells located juxtapose the openings 29 by a suitable means such as a piston 36. For filling a small honeycomb structure, no more than a few inches in diameter, a piston as depicted in FIG. 3 may be formed by attaching a handle to a section of the honeycomb structure and covering its opposing surface with masking or polyester tape. Alternatively, a mass 34 of plastically formable sealing material may be applied to the covering 28 and forced through the openings 29 by some other suitable means such as the blade 37 of the squeegee, putty knife or the like, as indicated in FIG. 4. Of these two methods, that of FIG. 3 is preferred as it has been found to charge cement to more uniform depths in the cell ends and to create fewer voids or pinholes in the cement plugs formed.

In forming ceramic solid particulate filter bodies foam-type cement is preferred. When sintered, this cement foams and expands and is more likely to fully fill the cell ends into which it was charged than other cements. For the cordierite honeycomb structures described in the Frost and Lachman application Ser. No. 165,646, the foam-type manganese-magnesium cordierite cement described and claimed in the application Ser. No. 165,647, filed July 3, 1980 and entitled CERAMIC FOAM CEMENT, now U.S. Pat. No. Re. 31,405, by Robert J. Paisley, which is incorporated in its entirety by reference herein, and the particular composition of that cement described in the aforesaid application Ser. No. 165,646 by Frost and Lachman can be used and fired in accordance with the indicated schedule. The cement is formed by mixing ceramic raw material with a methyl cellulose binder and plasticizer. When using this foam-type cement, the cordierite honeycomb structure is normally sintered prior to the plugging process which has been previously described. The cement is charged to a depth of at least one-quater inch (6.4 mm) and preferably one-half inch (12.7 mm) to assure completely filling the cell end when the cement is fired and foamed. The invention may, of course, also be used with non-foaming sealing material as well.

In forming a solid particulate filter body, after a subset of alternate cells 22 have been plugged at the end face 23 in the manner described, the process is repeated at the remaining end face 24. Openings are formed through the covering 28 at the end face 24 opposite each of the remaining cells, i.e. those cells not having previously been plugged at the end face 23. One method found useful for this process was to place the honeycomb structure with its end face 23 down over a brightly lit surface. Those cells which were not plugged at the end face 23 would transmit light at the end face 24 and could be identified for forming openings through the covering 28 opposite them. After suitable openings have been formed at the end face 24 the sealing material is again charged through the openings into the proximal end of the remaining cells in the method previously described.

It will be appreciated that the method may be practiced by covering and forming openings at each end face and then charging the sealing material simultaneously or sequentially into both end faces. The step of placing the structure over a light source for forming openings through the second end face works for this method as well. Those cells from which the covering has been removed transmit light more effectively than those which remain covered, even by a transparent film.

Figure 5:
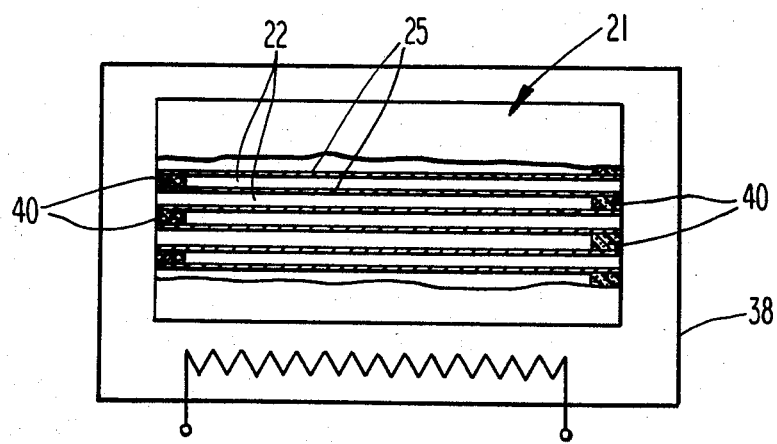
FIG. 5 depicts schematically the curing of the sealing material charged into the honeycomb structure by baking.

After charging, the surfaces of the coverings 28 at the end faces 23 and 24 are wiped clean. When fabricating a filter body the sealing material is dried or cured if necessary by suitable means. For example, if ceramic cements are used with the suggested ceramic honeycomb structure, the cement and structure are fired in an oven 38 as is indicated in FIG. 5, to foam and sinter or merely sinter the cement to the walls 25. If adhesive backed masking tape or the preferred adhesive backed polyester tape is used as a covering, it may be left on and will burn away during the firing process (FIG. 5). Of course, the covering may be removed before firing if desired. However, in such cases it should be left undisturbed on the end faces 23 and 24 of the structure 21 until the cement has dried to avoid the cement being pulled from the cell end during its plastically formable state by the adhesive backing on the tape. Plugs 40 formed in the honeycomb structure by the charging process described are also depicted in the partially sectioned view of the structure 21 in the oven 38.

Figure 6:
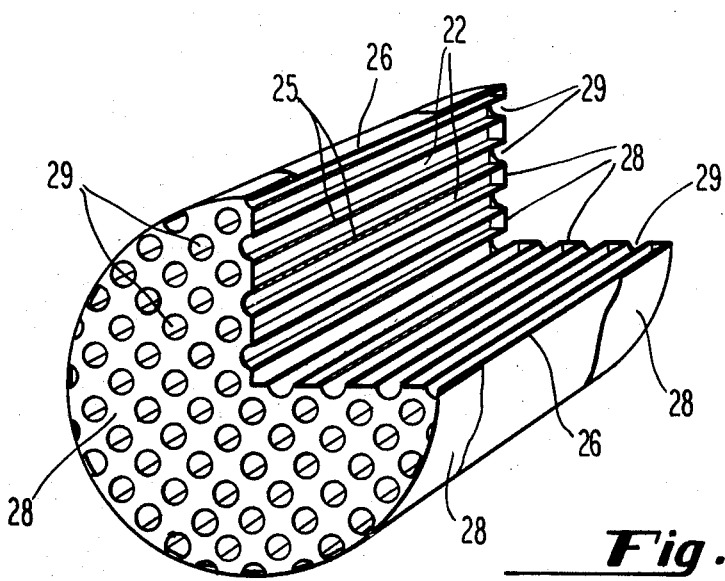
FIG. 6 is a partially sectioned profile view of the solid particulate filter body formed from the honeycomb structure with a perforated flexible film adhered to each of its end faces using the method of FIGS. 1 and 2.

FIG. 6 is a sectioned view of the honeycomb structure 21 with a covering 28 adhered to end face 23 (as shown in FIG. 1) and side walls 26 and having a first set of openings 29 exposing the open ends of a first plurality of the cells 22 at that end face and a similar covering 28 at the remaining end face 24 (rear surface of structure 21 in FIGS. 1 and 6) having a second plurality of similar openings 29 exposing the ends of the remaining cells 22 of the honeycomb structure. Again the cells of the structure are arranged in substantially mutually parallel rows and substantially mutually parallel columns and the ends of alternate cells exposed in a checkered or checkerboard pattern, the patterns being reversed at each end face 23 and 24. Where the coverings 28 are adhered to the end faces 23 and 24 and fully cover each of the cells as does the adhesive backed tape, hot melt glue and waxes, the structure thus formed will also function as a solid particulate filter for a fluid of a composition and at a temperature which will not damage the covering 28 or its adhesion to the end faces.

Figure 7:
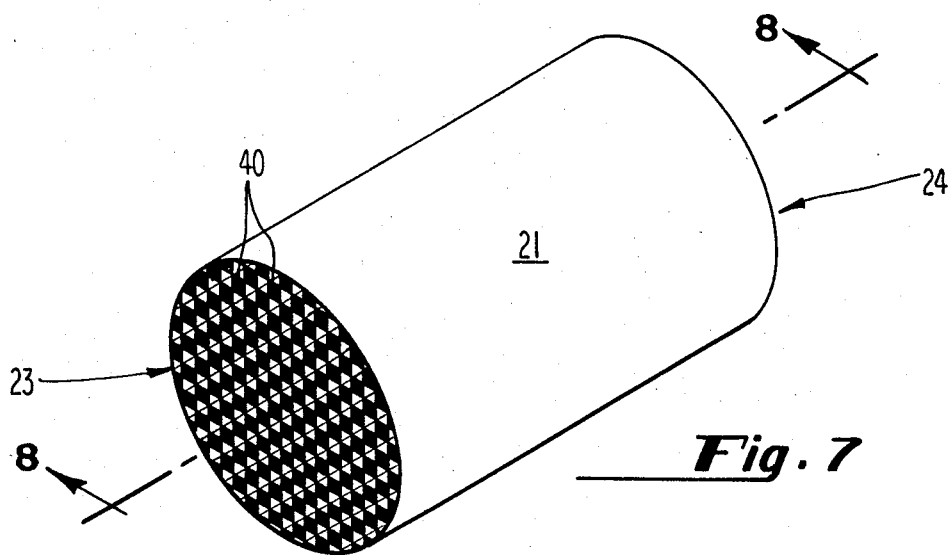
FIG. 7 depicts the solid particulate filter body fabricated by selectively plugging the cells of a honeycomb structure using the method of FIGS. 1 through 5.
Figure 8:
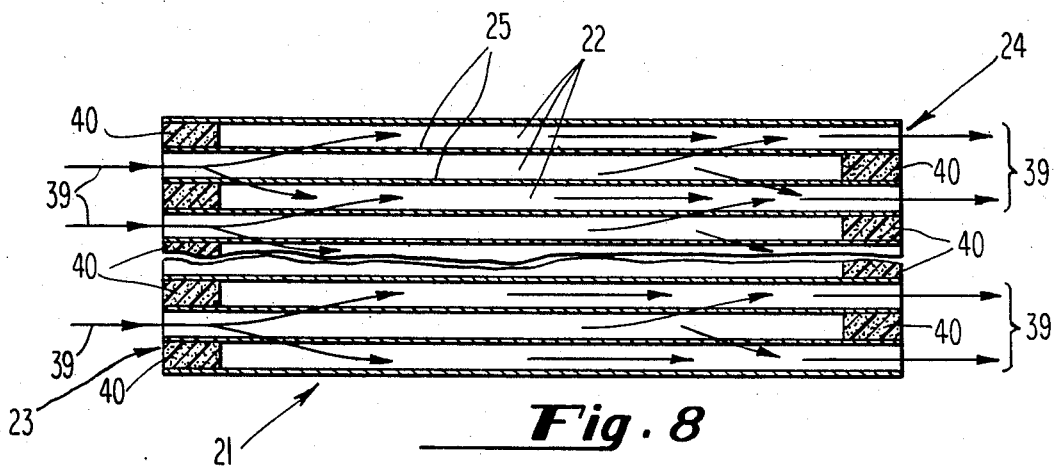
FIG. 8 is a cross-sectional view of the filter body of FIG. 7 along the lines 8—8 showing the sealed cell ends in greater detail.

The filter body formed by charging a sealing material into the cell ends opposite the openings 29 of the structure 21 depicted in FIG. 6 is depicted in FIG. 7 and in a sectioned, expanded view in FIG. 8. The cells at the end face 23 have been sealed (indicated by shading) in a checkered or checkerboard pattern. The cells which adjoin (share a common intervening thin wall 25 with) each cell sealed at the end face 23 are themselves open at the end face 23 but sealed at the far end face 24. Thus the pattern of sealed cells at the end face 24 is the reverse of that seen on end face 23 in FIG. 7. Similarly, the cells sealed at the end face 23 are open at the end face 24 as can be seen more clearly in FIG. 8 which is a sectioned and exploded view of a row of cells from the structure 21 of FIG. 7. FIG. 8 also shows the pattern of fluid flow through the manifolded honeycomb structure 21 when it is being used as a solid particulate filter body. Fluid flow is indicated by the lines 39 with arrows. The fluid 39 passes into an inlet group of cells, those being open at the end face into which the fluid is directed (end face 23 of FIG. 8) but because the cells are blocked by the plugs 40 formed during the mainfolding operation at the far end face 24, the fluid under some pressure passes through the pores or open porosities in the cell walls 25 at the top, bottom and both sides (not seen) of the inlet cells so as to enter adjoining outlet cells which are sealed at the inlet end face 23 and open at the outlet end face 24 of the structure 21. While the fluid 39 passes through the cell walls 25, sufficiently large contaminants in the fluid cannot pass through the pores in the cell walls and accumulate at the inlet cells. Closure means 40 at the end face 23 prevent the entry of contaminated fluid into the outlet cells and the backflow of cleansed fluid from the outlet cells through that end face. It will be appreciated that the closure means 40 may be porous or non-porous, although in the former case, the porosity should be no greater than that of the thin walls 25 to assure proper filtering of the contaiminated fluid. Some porosity is provided in the aforementioned foam-type cordierite cement. Non-foaming ceramic cements may also provide porosity depending upon their composition and manner of setting or sintering.

As previously stated the subject method may be practiced on either a sintered (fired and sintered) or green (dried but unsintered) ceramic honeycomb structure. It has been found that the ends of the cell walls are not as readily damaged in the green honeycomb structures as in the fired honeycomb structures when contacted with an opening forming element. However, as the green honeycomb structure does not have the strength of a sintered structure, greater care must be employed in pressing the sealing material into the end face so as not to damage the structure during that step.

Figure 9:
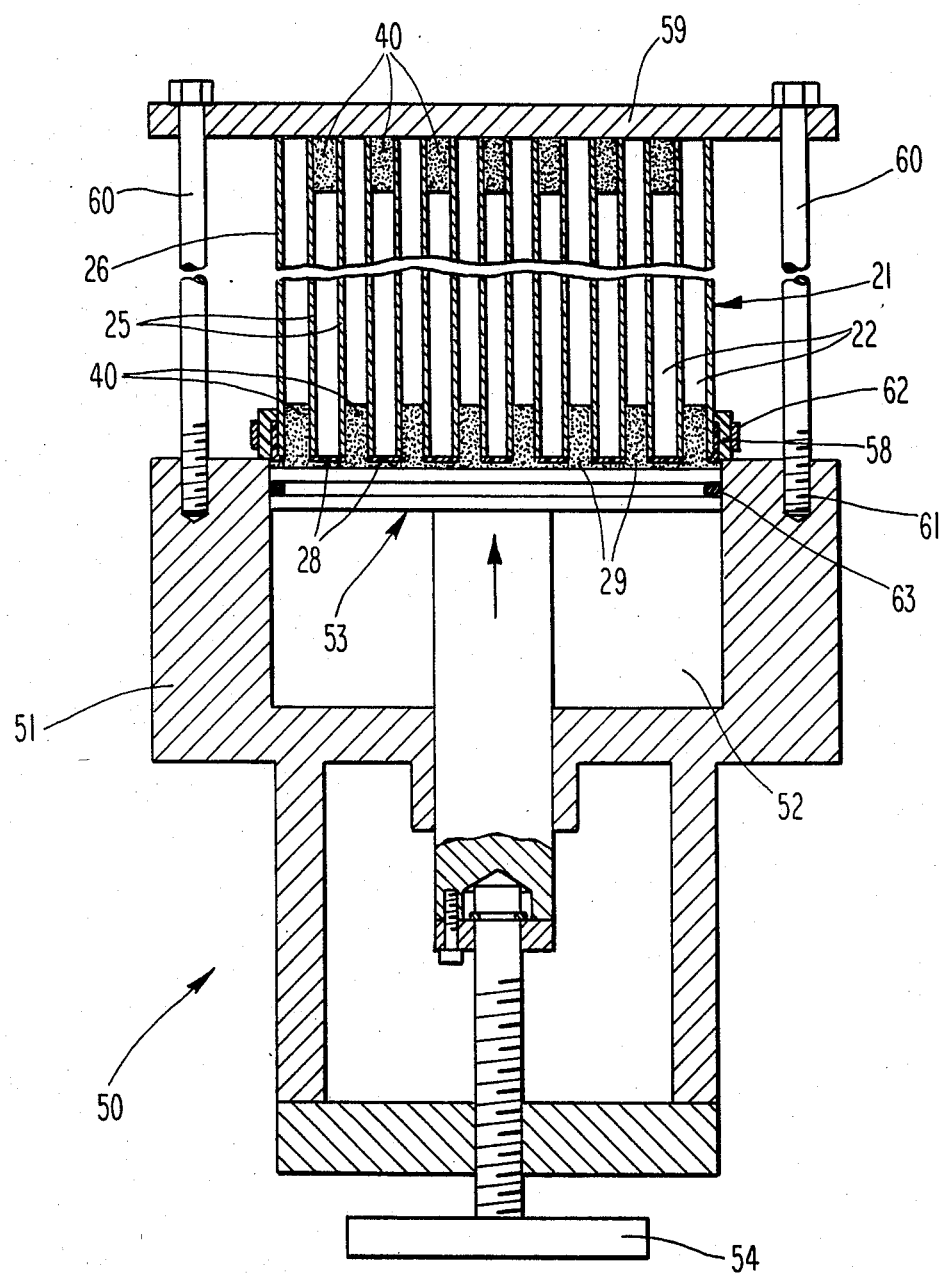
FIG. 9 depicts schematically a press apparatus for charging sealing material through openings in a covering over a honeycomb structure.

A more practical press apparatus 50 suitable for filling green or fired ceramic-based honeycomb structures of the type described several inches or more in diameter is depicted in FIG. 9. The press 50 comprises a press head 51 having a bore 52 and a piston 53. Movement of the piston 53 through the bore 52 is controlled by a hand-operated screw 54 or other suitable means. The bore 52 is open opposite the head of the piston 53 for receiving a honeycomb structure 21 for charging. The structue 21 is sectioned to reveal the outer skin 26 and a row (or column) of adjoining cells 22 and the walls 25 forming the cells. The lower end face of the structure 21 having a covering 28, has been positioned against the open end of the bore 52. The covering 28 which has also been sectioned, reveals openings 29 extending therethrough opposite the open end of each alternate cell. In FIG. 9, a plastically formable sealing material has already been charged through the openings 29 into the opposing cell ends forming plugs 40. For the foamtype manganese-magnesium cordierite cement referred to, a filling depth of approximately one-quarter inch (6.4 mm) is desired and approximately one-half inch (12.7 mm) is preferred in order to provide a sufficient cement mass to assure the cell end is sealed when the cement is sintered. Note that alternate cells of the structure 21 are sealed with plugs 40 at its two opposing end faces as was the structure 21 in FIGS. 7 and 8, those alternate cells at the top end face having been filled in a previous charging step. The honeycomb structure 21 is held in place over the bore 52 by means of a covering plate 59 held down by suitable means such as bolts 60 which are screwed into appropriately threaded bores 61 in the press head 51. A flexible collar 58 is fitted around the side walls 26 of the structure 21 at the covered (lower) end face by appropriate means such as an adjustable clamp 62 and is provided to prevent blowby of cement passed into the end face during the pressing operation and to cushion the end face of the structure while sitting on the press head 51.

Operation of the press 50 is as follows. The piston 53 is withdrawn by means of the hand-operated screw 54 into the bore 52 forming a chamber on the top side of the head of the piston 53. A mass of plastically formable filling or sealing material, such as the aforementioned foam-type cordierite cement, is applied to the upper surface of the piston 53. The collar 58 is fitted to the honeycomb structure 21 at an end face having a perforated covering 28 attached. The covered end face of the structure, which has been previously fitted with the collar 58 and clamp 62, is secured into place over the mass of sealing material by means of the plate 59, which itself is secured into place over the top end face of the structure 21 by means of the bolts 60. The piston 53 is then advanced using the hand-operated screw 54 forcing the sealing material through the openings 29 and into the opposing cell ends. The head of the piston 53 may be equipped with suitable means such as an O-ring 63 to prevent blowby of the sealing material down passed piston 53 during the pressing operation.

Figure 10:
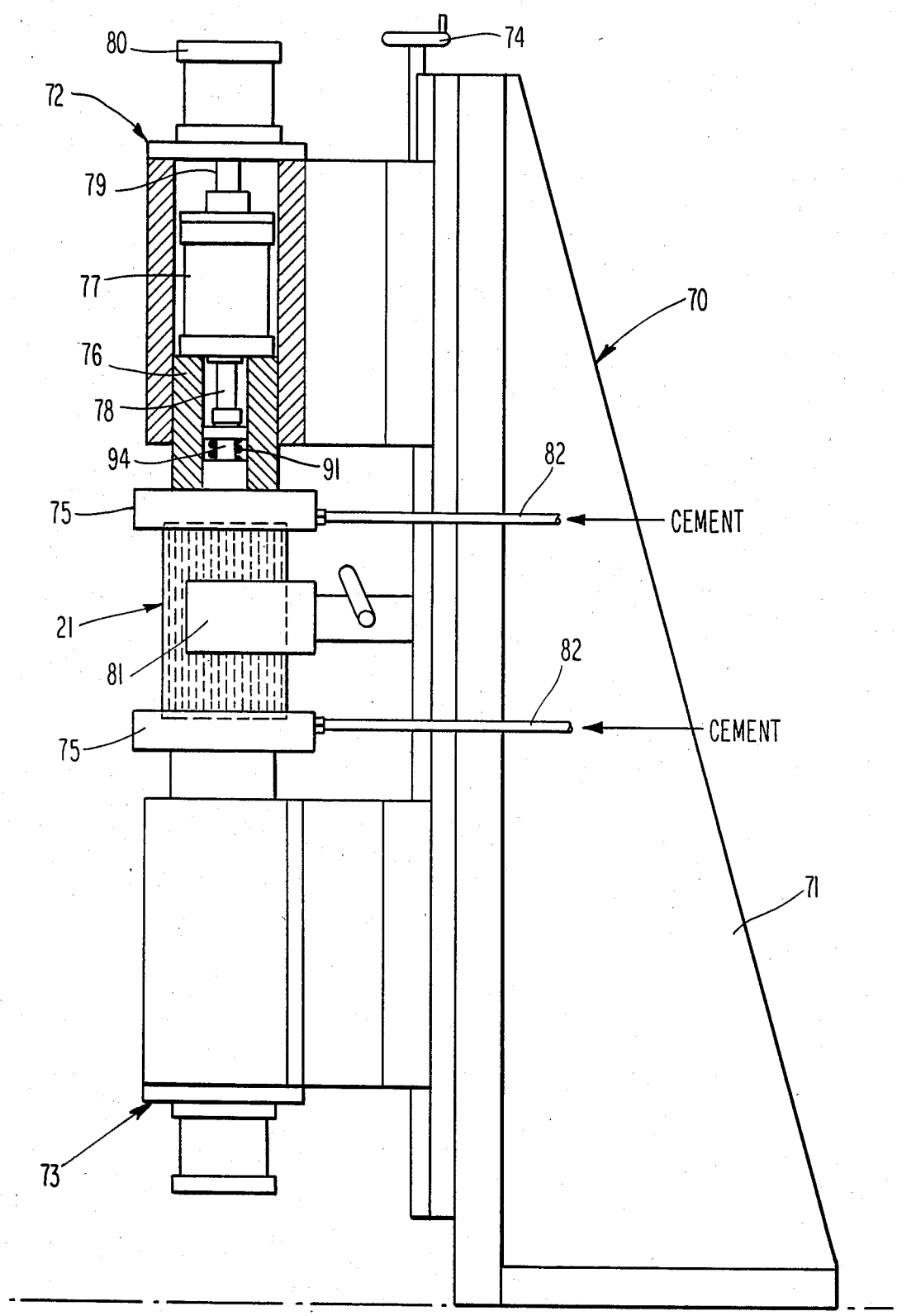
FIG. 10 depicts schematically a preferred embodiment press for bulk charging sealing material through openings in a covering adhered to a honeycomb structure.
Figure 11:
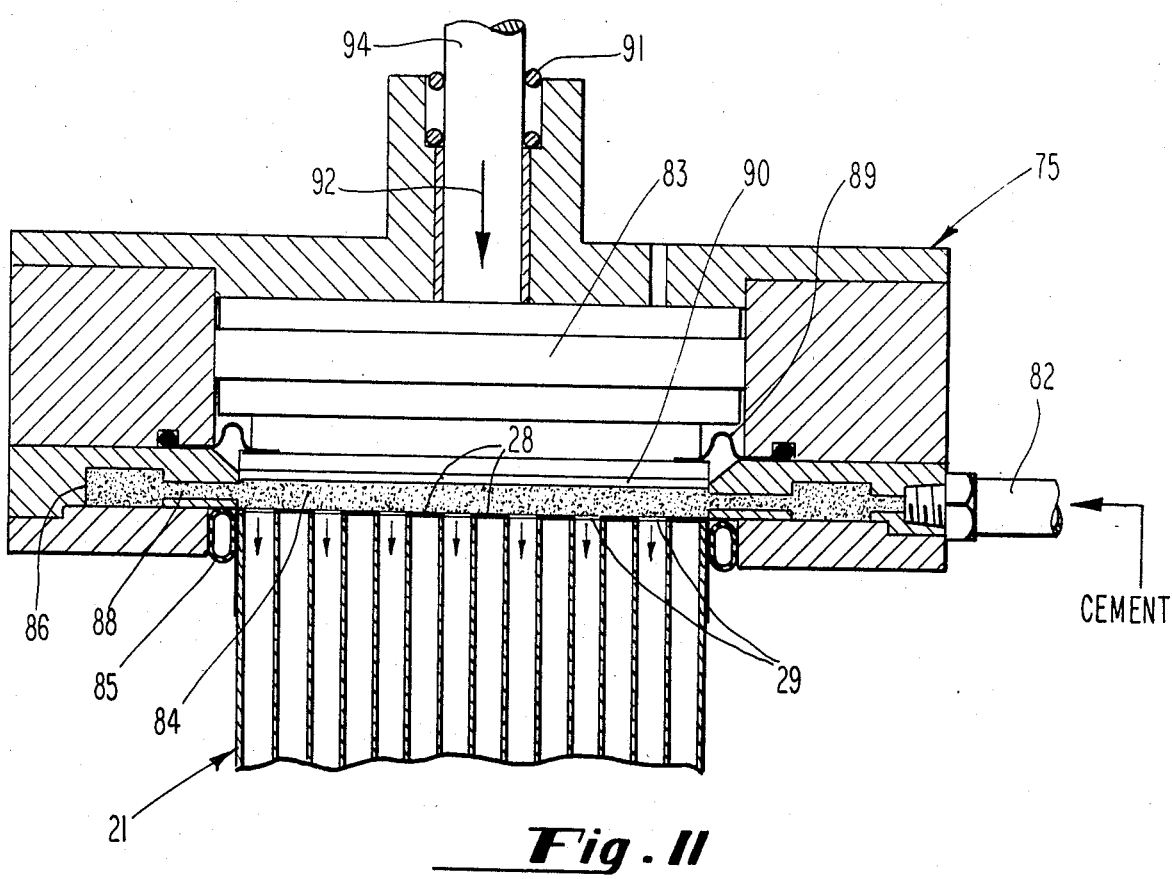
FIG. 11 depicts schematically in a sectioned, profile view a press head of the apparatus of FIG. 10.
Figure 11A:
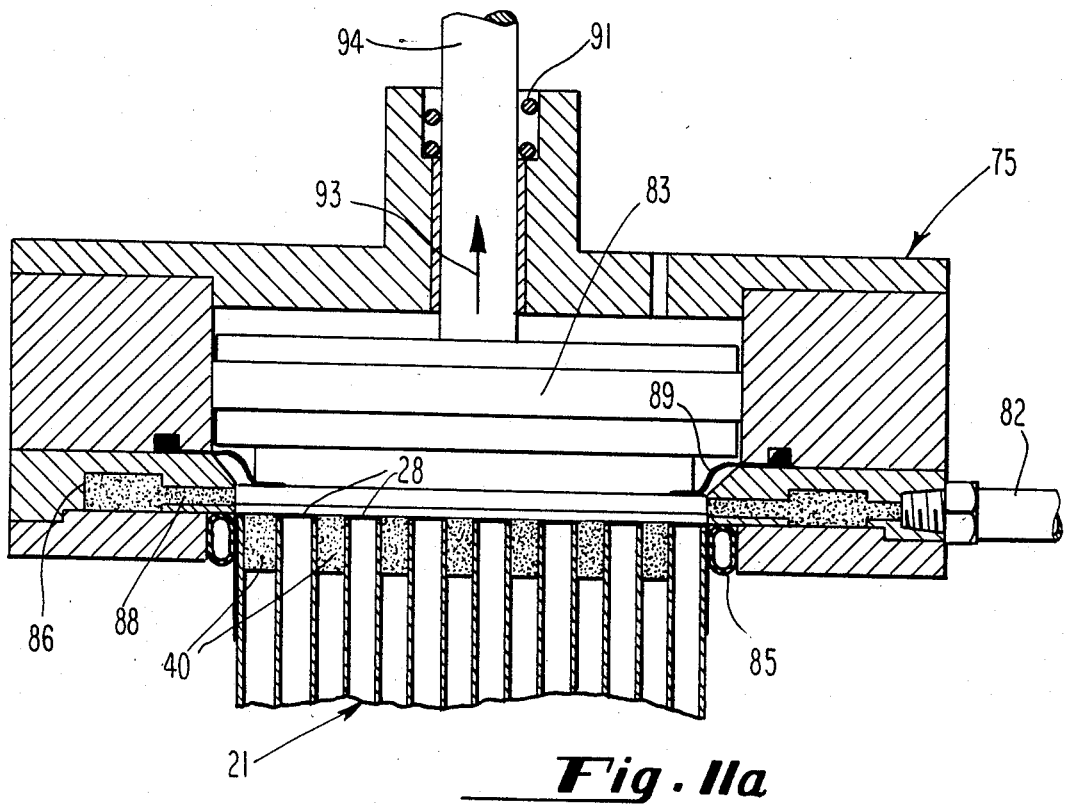
FIG. 11a shows the press head of FIG. 11 in the advanced position.
Figure 12:
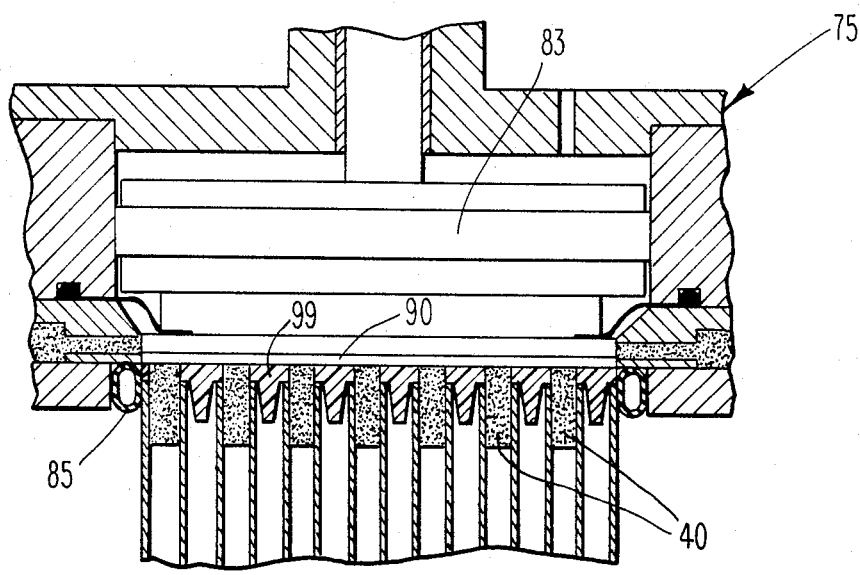
FIG. 12 is a schematic sectioned profile view of the press head of FIGS. 11 and 11a being used with a flexible mask embodiment.

A preferred, double headed cement press 70, which is yet another aspect of the invention, is depicted in partially sectioned profile in FIG. 10 and comprises a frame 71 and upper and lower cement heads 72 and 73. The lower head 73 is fixed to the frame 71. The upper head 72 is adjustable in height above the lower cement head 73 by means of a screw 74 turning appropriate mechanical linkages such as a rack and pinion (not depicted) between the frame 71 and upper cement head 72 to accomodate honeycomb structures 21 of various heights. The cement heads 72 and 73 are identical in construction and the upper head 72 has been sectioned to reveal its major components. A press head 75, depicted in greater detail in FIGS. 11, 11*a*, and 12, is provided for pressing a ceramic cement or other plastically formable material into the honeycomb structure 21. The press head 75 is affixed by suitable means 76 such as a metal collar to a first air cylinder 77. A plunger 78 is advanced towards the press head 75 by the operation of the cylinder 77 to advance a piston 83 in the press head 75 (see FIGS. 11, 11*a*, and 12) by means of a connecting shaft 94 of the piston 83 charging the plastically formable cement into the honeycomb structure 21. The press head 75, plunger 78 and first air cylinder 77 can be raised for the insertion or removal of the honeycomb structure 21 by operation of a suitable device such as a second air cylinder 80 and a second plunger 79 extending from the second cylinder 80 and connected to the first cylinder 77. A mechanical jaw 81 or similar device may be provided to automatically insert and remove the honeycomb structure 21 from the press 70. Means such as cement feed tubes 82 are provided to carry cement to the press heads 75 for charging into the structure 21.

FIGS. 11 and 11*a* depict a sectioned press head 75 with its piston 83 in retracted and advanced positions, respectively, and a partially sectioned honeycomb structure 21 having an end face covered with a thin film covering 28. Openings 29 have been formed through the film covering 28 over alternate cell ends in the manner previously described. The end face of the honeycomb structure is held in position across a feed chamber 84 in the press head by means of a pneumatically inflated collar 85 affixed to the press head and surrounding the side walls of the structure 21 near its end face. The collar may be simply a flexible, inflatable tube or, more desirably, may be such a tube fitted with a protective covering around its inner periphery such as a split ring metal collar (not depicted) which may be compressed around the side walls of the structure 21 to better grip the structure and prevent wear of the tube. The ceramic cement is carried to the press head 75 through the feed tube 82 and injected into the chamber 84 through suitable means such as from a first hollow annular ring 86 formed in the press head 75 through a concentric annular passage 88 also formed in the head 75 which is open at its outer circumference to the ring 86 and at its inner circumference to the chamber 84. It is also envisioned that the cement may be injected into the chamber 84 by means of a bore axially through the piston 83. After charging the chamber 84 with cement, the piston 83 is advanced by activation of the first air cylinder 77 which extends the first plunger 78 in the direction indicated by the arrow 92. The plunger 78 strikes a connecting shaft 94 of piston 83, advancing the piston 83 in the same direction 92 which presses the cement in the chamber 84 through the openings 29 into the alternate cell ends forming plugs 40 as depicted in FIG. 11*a*. The piston 83 is then retracted in the direction indicated by the arrow 93 by suitable means such as a compression spring 91 around the connecting shaft 94 of the piston 83. A flexible annular gasket 89 is also affixed near the head of the piston 83 and to the body of the press head 75 to prevent blowby of the cement into the piston bore. The piston 83 is formed from several joined segments, as indicated, to allow insertion of the gasket 89. The head of the piston 83 is smaller than its body to provide sufficient space for movement of the gasket 89. A Bellofram TM diaphram which is formed from a butyl rubber impregnated nylon fabric has been found sufficiently durable for use as the flexible gasket 89. If desired the surface 90 of the piston head 83 facing the chamber 84 may be coated with a neoprene rubber or other soft resilient material to prevent possible damage to the honeycomb structure 21 when the piston head 83 is advanced. It is also envisioned that the press 70 may also be used with a flexible mask 99 as is depicted in FIG. 12. The mask 99 is described in copending application Ser. No. 283,734, filed July 15, 1981, by Max Montierth, now U.S. Pat. No. 4,411,856, and incorporated by reference herein.

Figure 13:
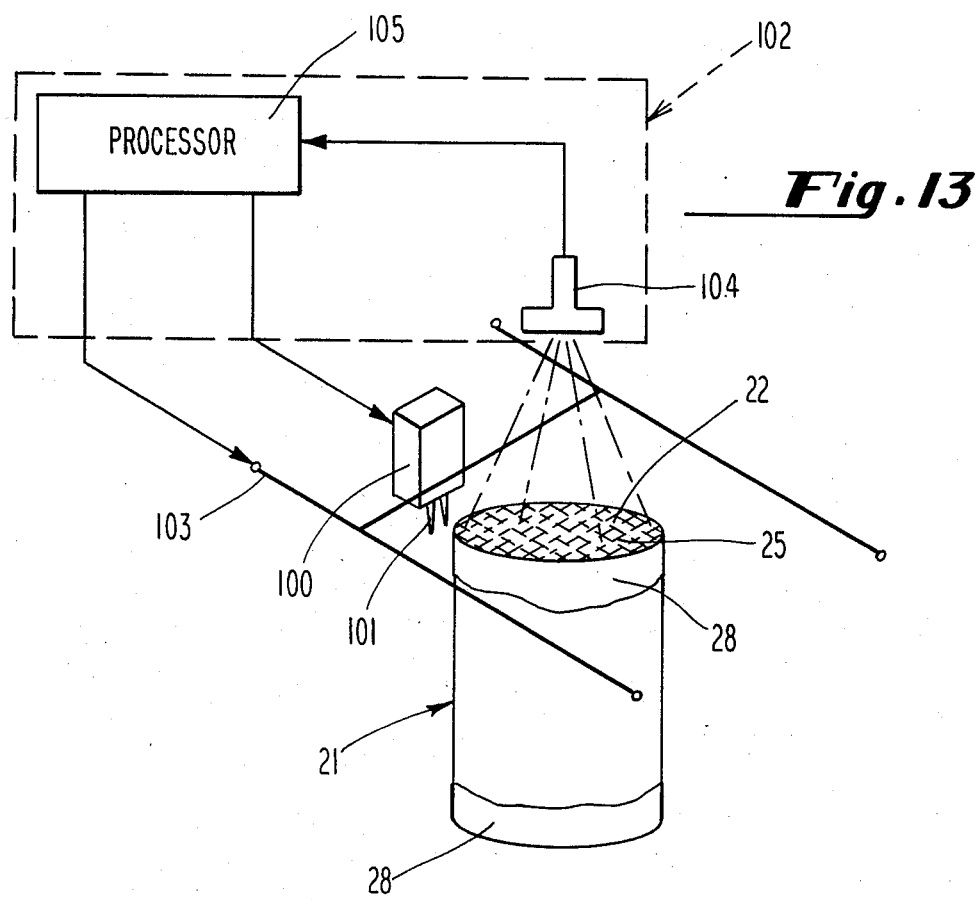
FIG. 13 depicts an envisioned preferred embodiment of the invention for creating openings through the covering.

It is envisioned that the step of forming openings through the covering over the cells of a honeycomb structure will be automated for increased efficiency. A schematic diagram of an automatic opening forming apparatus is provided in FIG. 13 and depicts the honeycomb structure 21, an image analyzer 102, opening forming means 100 and a precision jig 103. A honeycomb structure 21 is provided with a solid, thin covering 28, such as the preferred transparent polyester film, over its end faces. The precision jig 103 and opening forming means 100 operate in response to signals generated by the image analyzer 102 which comprises a scanning means 104 and a processer 105 such as a minicomputer. The covering at one end face is scanned by scanning means 104 which generates a set of signals indicating the locations of the cell ends 22 and/or the thin walls 25 forming the cell ends beneath the covering 28 (depicted in phantom). An optical device such as a television or video tape camera may be used with a translucent or transparent covering such as the preferred polyester film. Commercially available units may be selected for use. The signals generated by the scanning means 104 are passed to the processor 105 which, in response to the signals and its own internal programming, generates a second set of signals for positioning and controlling the operation of the device 100 for forming openings through the covering. It is envisioned that the device 100 forms openings through the covering by means of one or more opening forming elements 101 which preferably melts but may bore, drill, or cut through the covering 28. The opening forming device 100 is secured to jig means 103 for positioning and operation. The jig means 103 is envisioned to be a device for precision positioning the opening forming device 100 in a plane above and substantially parallel to the covered surface of the honeycomb structure 21, and operates in response to the signals generated by the processor 105. The device 100 is further envisoned to advance and retract opening forming element(s) 101 to and from the covering 28 and to activate the element(s) 101 such as by heating so as to form openings through the covering 28, again in response to signals generated by the processor 105. The heretofor identified components of this apparatus are merely illustrative and it is envisioned that other components may be used. For example, the surface of the honeycomb structure 21 may be scanned by other optical devices such as an array of optical fibers or through other penetrating scanning devices such as ultrasonic sound survey, X-ray, etc. It is also envisioned that other than transparent coverings may be used. For example, wax or hot melt glue may be charged into the cells to the end face of the structure while revealing at the end face the walls forming the cells. Lastly, heat may be supplied by some other means such as a low level industrial laser which is aimed by the processor 105 but does not actually contact the covering 28 over the structure 21.

Figure 14:
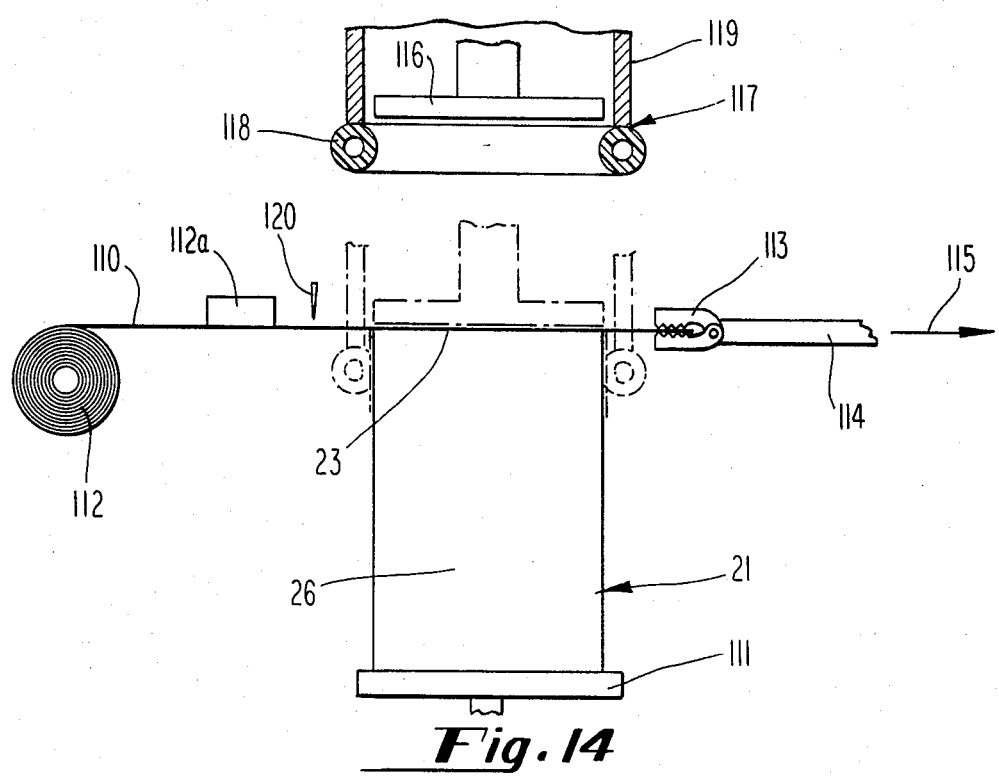
FIGS. 14 and 14a depicts envisioned embodiments of a flexible tape dispenser for covering end faces of honeycomb structures.
Figure 14A:
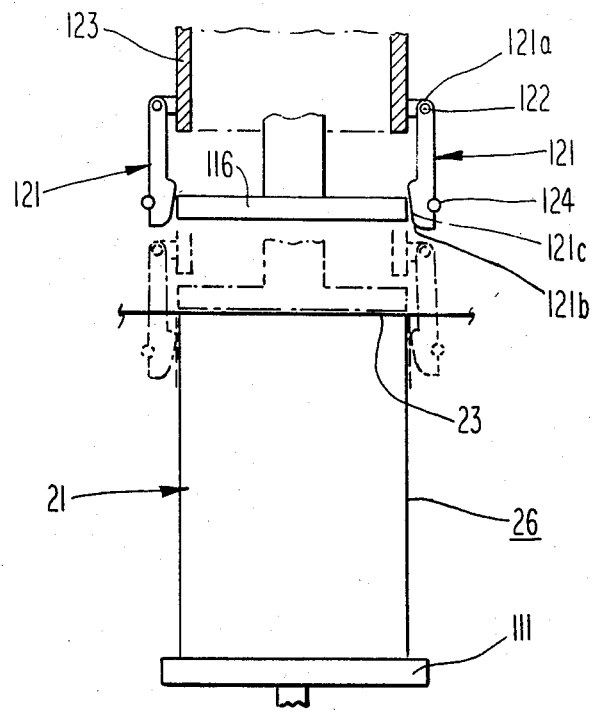

FIG. 14 depicts yet another aspect of the invention, a dispensing apparatus for automatically applying a length of tape or other preformed solid film or web to an end face of a honeycomb structure. Suitable means such as an actuated jaw 113 mounted to a linear acting arm 114 are provided for pulling the tape 110 from a roll 112 on which it is stored and over an end face 23 of a honeycomb structure 21. The jaw 113 is extended by the arm 114 and grips the leading edge of the tape 110 stored on a roll 112. Means such as vacuum head 112*a* may be provided for holding the leading edge of the tape 110 away from the roll 112 in a position to be gripped by the jaw 113. The jaw 113 is retracted by the arm 114 in the direction of the arrow 115 pulling the leading edge of the tape 110 passed the end face 23 of the honeycomb structure 21. Preferably, the tape 110 is a pressure sensitive adhesive backed polyester film. The end face 23 of the structure 21 is positioned in close proximity to the adhesive backed side (bottom side in FIG. 14) of the length of tape unrolled by the jaw 113. Preferably, the structure 21 is subsequently moved into position so as not to interfere with the operation of the jaw 113 and arm 114 pulling the tape 110 into position. Suitable means such as a hydraulically operated lift 111 may be provided for that purpose. Other suitable means such as a piston head 116 are provided to firmly press and adhere the film against the end face 23. A suitable means, such as a heated edge 120, severs a suitable length of the tape pressed to and extending to either side of the end face 23 from the remainder on the roll 112. The jaws 113 are actuated and removed from the tape 110. Additional means 117 are provided to smooth the tape 110 across the end face 23 and to press it firmly against the sidewalls 26 of the structure 21. The means 117 depicted have been sectioned and comprise an annular collar 118 of a flexible, somewhat elastic material such as neoprene which is mounted to a rigid ring 119 or other suitable means for movement to and from the structure 21. The collar 118 has a circumference slightly less than that of the end face 23 and is stretched when pushed passed the end face 23 and onto the sidewalls 26 by the ring 119. A second embodiment of the means 117 is depicted in FIG. 14*a*. In the second embodiment the flexible collar 118 has been replaced by a plurality of rigid fingers 121 which are mounted by pivot means 122 at one of their ends 121*a* to a rigid ring 123 or other suitable means for movement to and from the end face 23 of the structure 21. The leading inner edge 121*b* of each of the fingers 121 is beveled, causing the fingers to spread from one another when initially contacting the end face 23. Each finger 121 is also provided with a suitable surface 121*c* just passed the beveled surface 121*b* for frictionally gripping the tape 110 stretched across the end face 23 (see FIG. 14). When the ring 123 is advanced towards the end face 23, the fingers 121 pivot away from the end face 23 due to the beveled surface 121*b* and ride along the sidewalls 26 of the structure 21. Means such as a garter tension spring 124 are provided to bias the fingers 121 towards the sidewalls 26 of the structure 21. The piston 116 prevents the ends 121*b* of the fingers 121 from being pivot too inwardly and is advanced with the means 117 against the structure 21. Alternatively a contact point between the finger 121 and ring 123 may be provided to prevent excessive inward biasing of the fingers 121 which would prevent the beveled surface 121*b* from contacting the sidewalls 26 where they meet the end face 23. Although the preferred use of the described embodiments would be to apply a pressure sensitive adhesive backed film, it is envisioned that a web or film backed with a thermosetting adhesive or a shrink-fit polymer film may also be applied to a honeycomb structure using the described apparatus. In this instance, the piston means 116 would be merely used to hold the tape 110 in position until gripped by the means 117. If the temperature required to set the adhesive or shrink the film selected is sufficiently high, the neoprene collar 118 of the embodiment in FIG. 14 may have to be replaced with some other material such as a large metal garter spring or the embodiment of the means 117 in FIG. 14*a*.

Figure 15A:
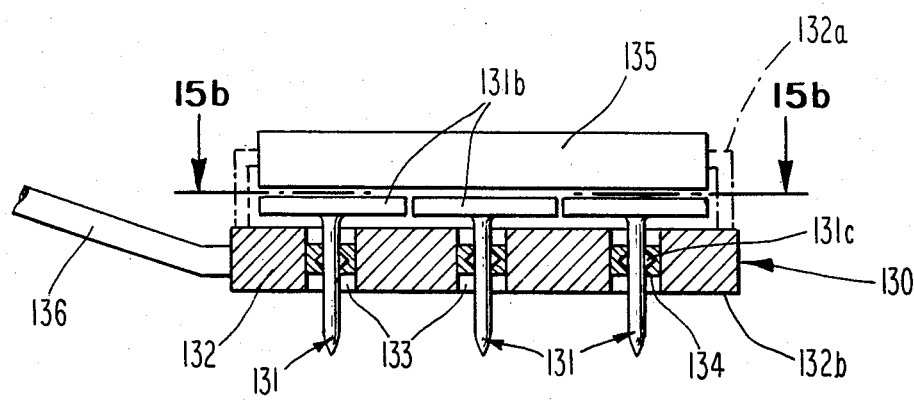
FIG. 15a, 15b, and 16 depict two embodiments of heated, opening forming tools.
Figure 15B:
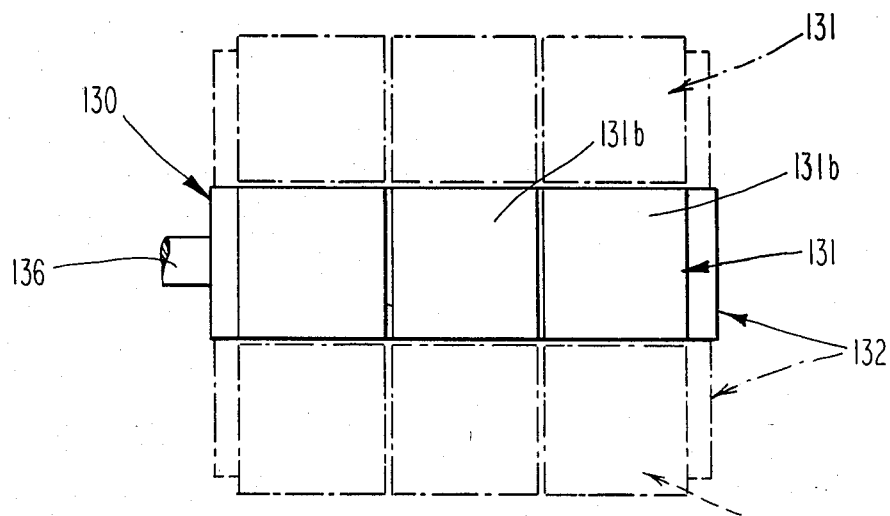
Figure 16:
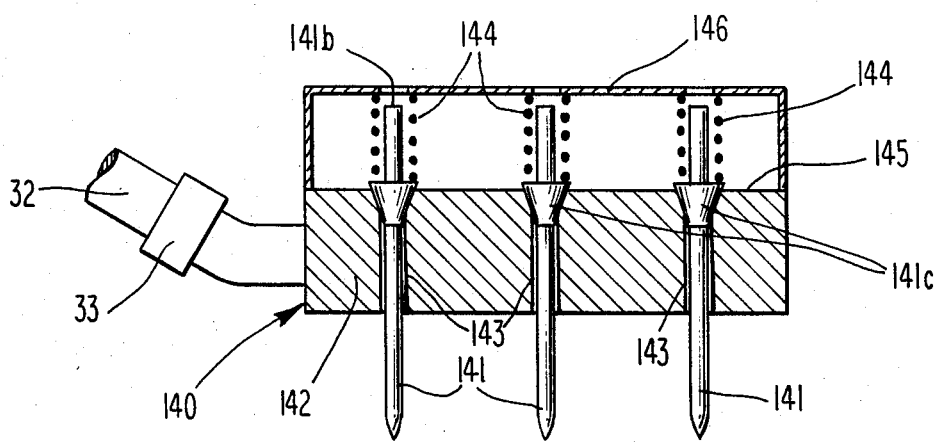

FIGS. 15*a* and 15*b* depict an embodiment for flexibly mounting, and FIG. 16 depicts an embodiment for floatably mounting a plurality of heated, opening forming elements 131 or 141 in a tool 130 or 140, respectively. Mounting by either method allows each element 131 and 141 to move slightly in a transverse horizontal plane and to pivot or cant slightly so as to compensate somewhat for cellular and thin wall distortions in a work piece such as the previously described honeycomb structures 21 which are covered at an end face with a meltable covering. An envisioned preferred tool 130 flexibly mounting a plurality of elements 131 is depicted in profile in FIG. 15*a* and in a top view in FIG. 15*b*. The tool 130 comprises a rigid block 132 having a number of bores 133 extending therethrough and an opening forming element 131 extending through each bore 133. According to the invention, each element 131 is connected to the block 132 by means of a suitable material extending between and connected to each. Accordingly, each element 131 is embedded in a layer or plug 134 of a material affixed in the bore 133 which flexibly holds the elements 131 in predetermined positions yet allows them some canting and movement in the bores 133 when the elements 131 are pressed against a work piece. The opening forming elements 131 are fabricated from copper, brass, or another material having a high thermal conductivity. Each element 131 has a head 131b having as great a surface area as possible without overlap to provide a large area through which heat may be passed into the element 131. The heads 131b also extend beyond the perimeter of the bores 133 to prevent radiant heating of the plugs 134 by a heat source 135 provided for heating the elements 131. Suitable means such as tangs 131c or circumferential ridges (not depicted) may be provided to further fix the elements 131 in the plugs 134. It is envisioned that the plugs 134 are formed from a flexible, preferably elastic material which is not damaged or deleteriously softened or hardened by exposure to temperatures needed to melt polyester, about 260° Centigrade. Those skilled in the art will recognize that certain classes of materials are generally suitable for use in this context. These include certain silastic materials such as polysioxane rubbers, and certain silicone rubbers, especially those which have relatively high molecular weights. Also among these classes are the typically less elastic fluorocarbons including polytetrafluoroethylene, polyvinylidenefluoride, FEP and other fluoropolymers. In addition to these classes, those skilled in the art will recognize that other classes of resinous species may also be suitable for use in the practice of the depicted and other embodiments of this invention. The heat source 135 may be separately located and the elements 131 heated by moving the tool 130 between the source 135 and the work piece or may be directly mounted to the tool over the element heads 131b by suitable means such as frame elements 132a (depicted in phantom). In either case, the elements 131 may be radiantly or conductively heated through their heads 131b by the source 135. Preferably, the temperature of the heat source 135 is controllable to protect against possible overheating of the flexible plugs 134 by overheating of the elements 131. A handle 136 is also provided for movement of the tool 130. Additional elements 131 may be added to the tool 130 as indicated in phantom in FIG. 15b to form a twodimensional array of opening forming elements. It is also envisioned that the flexible material of the plugs 134 may be affixed in a layer across the lower surface 132b of the frame 132 extending across the bores 133.

FIG. 16 depicts a second embodiment for floatably mounting heating elements 141 in a tool 140. The tool 140 comprises a rigid block 142 provided with bores 143 extending therethrough, each of which receives an opening forming element 141. The bores 143 are slightly oversized compared to the diameters of the opening forming elements 141 allowing the elements 141 to move slightly in the lateral plane and to cant within the bore 143. The bores 143 are also countersunk at the upper surface 145 of the block 142 and the elements 141 are each provided with a conical flair 141c for self-centering of the elements 141 when they are not being pressed against the work piece. Means such as a compression coil spring 144 positioned above the conical flairing 141c, are provided to keep the elements 141 resistably centered in the bores 143. A covering 146 is provided over the block 142 and heads 141b to keep the elements 141 within the block 142 and to provide a resistance point for the compression of the spring 144. The block 142 is preferably formed from copper, brass or another highly thermoconductive material and is used to transfer heat to the elements 141. The block 142 may be affixed to a suitable heat source such as a pen soldering iron 32 by means of a coupling 33 in the manner previously described (see FIGS. 2 and 2a). Again, additional elements 141 may be added to form a two-dimensional array of the opening forming elements 141 (see FIG. 15b).

While particular embodiments of the present invention have been shown and described and some modifications suggested, it will be appreciated that other modifications of the invention, not specifically mentioned, will occur to those skilled in the art and are intended to be included within the scope of the appended claims.

What is claimed:

1. A press apparatus for charging a flowable material into a honeycomb structure having a plurality of cells open at an end face thereof comprising:
   a press head having a chamber with an opening at an outer surface of the press head to accept said honeycomb structure for charging and further having a bore extending away from said chamber opposite said opening;
   means for securing said end face of said honeycomb structure across said opening, said means for securing comprising a pneumatically inflatable collar affixed to said press head;
   means for injecting said flowable material through said press head into said chamber;
   piston means slidably mounted in said bore for pressing said flowable material in said chamber into the end face of said structure; and
   a flexible annular diaphram affixed at its outer edges to said press head and at its center to said piston means.

2. A press apparatus for charging a flowable material into a honeycomb structure having a plurality of cells open at an end face thereof comprising:
   a press head having a chamber with an opening at an outer surface of the press head to accept said honeycomb structure for charging and further having a bore extending away from said chamber opposite said opening;
   means for securing said end face of said honeycomb structure across said opening;
   means for injecting said flowable material through said press head into said chamber, said means for injecting comprising a hollow annular ring communicating with said chamber through a concentric annular passage;
   piston means slidably mounted in said bore for pressing said flowable material in said chamber into the end face of said structure; and
   a flexible annular diaphram affixed at its outer edges to said press head and at its center to said piston means.

3. A press apparatus for charging a flowable material into a honeycomb structure having a plurality of cells open at an end face thereof comprising:
   a press head having a chamber with an opening at an outer surface of the press head to accept said honeycomb structure for charging and further having a bore extending away from said chamber opposite said opening;
   means for securing said end face of said honeycomb structure across said opening;
   means for injecting said flowable material through said press head into said chamber;

piston means slidably mounted in said bore for pressing said flowable material in said chamber into the end face of said structure; and said means for securing comprises a pneumatically inflatable tube collar affixed to said press head.

4. The apparatus of claim 3 wherein said means for injecting comprises a hollow annular ring communicating with said chamber through a concentric annular passage.

* * * * *